(No Model.)
S. P. HODGEN.
CHEESE CUTTER.
No. 355,081. Patented Dec. 28, 1886.
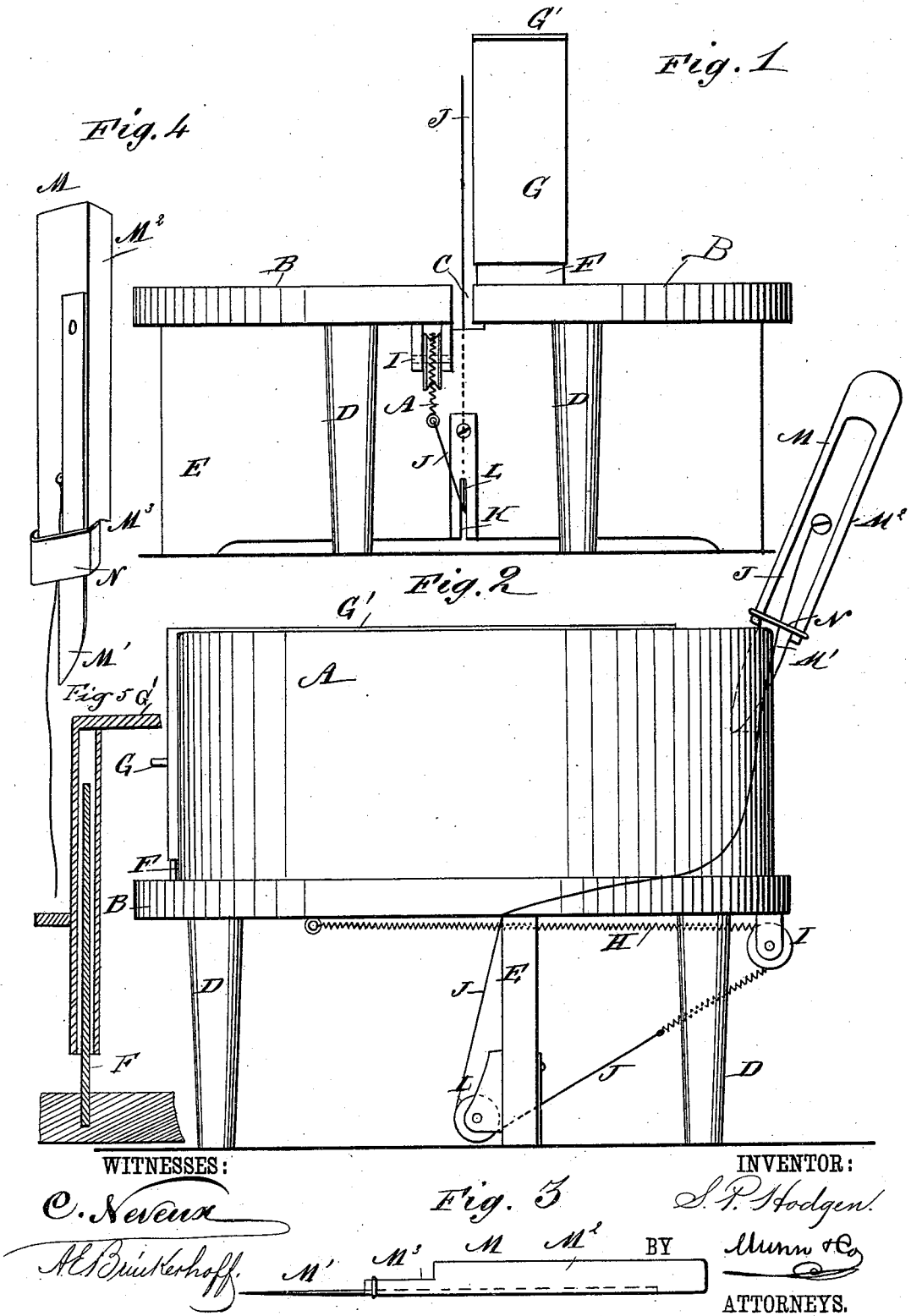
WITNESSES:
C. Neveux
A. E. Brinkerhoff
INVENTOR:
S. P. Hodgen
BY Munn & Co
ATTORNEYS.

UNITED STATES PATENT OFFICE.

SAMUEL P. HODGEN, OF PITTSFIELD, ILLINOIS.

CHEESE-CUTTER.

SPECIFICATION forming part of Letters Patent No. 355,081, dated December 28, 1886.

Application filed July 21, 1886. Serial No. 208,632. (No model.)

*To all whom it may concern:*

Be it known that I, SAMUEL P. HODGEN, of Pittsfield, in the county of Pike and the State of Illinois, have invented a new and Improved Cheese-Cutter, of which the following is a full, clear, and exact description.

The object of my invention is to provide a new and improved cheese-cutter by means of which a full cheese can be divided into two parts and slices of cheese cut from one part without crumbling or hacking the cheese, so that it may not dry out, as it would if haggled with a knife, and with which an inexperienced person may with great facility cut the cheese smoothly and with little waste.

The invention consists of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is an end elevation of my improved cheese-cutter. Fig. 2 is a side elevation of the same. Fig. 3 is a side view of the cutting-knife. Fig. 4 is a perspective view of the knife of modified form. Fig. 5 is a detail sectional view showing the movable guide.

The head of cheese A is placed upon the platform B, which is divided into two halves by a central slot, C, and is supported by the legs D and by a cross-piece, E, which extends at right angles to the said slot C, and is placed a short distance beyond the center of the platform B.

To the front end of one of the halves of the platform B is secured the upright F, on which is vertically adjustable the angular guide or gage G, the front edge of the horizontal arm G' of which extends centrally above the platform B parallel with the slot C.

One end of a spring or spring-cord, H, is secured to the under side of the platform B, runs parallel, or nearly so, with the slot C, and then passes over a grooved pulley, I, suitably mounted on the under side of the platform B. The end of the spring H is secured to a wire, J, which passes through a slot, K, in the cross-piece E, and under a pulley, L, mounted on the front of the said cross-piece E; and the wire J is then connected with a knife, M, which consists of a knife-blade, M', and a handle, M², provided with the recessed part M³, which fits into the slot C in the platform B.

The wire J is guided on the knife M by the cross bar or band N, secured to the lower end of the knife-handle M². The guide G can be adjusted to fit a thinner or thicker head of cheese.

The operation to halve the cheese is as follows. The cheese A is placed upon the platform B and adjusted until the part to be cut is over the slot C. The gage G is then adjusted on the standard F until the horizontal arm G' rests on the top of the cheese, as shown in Fig. 2. The operator then inserts the knife-blade M' into the bottom of the cheese on the back side of the cross-piece E, so that the recessed part M³ of the knife rests in the slot C, and then draws the knife M to the back edge of the platform B, and then up the back edge of the cheese A and toward the end of the horizontal arm G', and along the front edge of the latter, and down the front of the cheese until the recessed part M³ of the knife M again enters the slot C of the platform, and the operator then moves the knife inward to the rear of the cross-piece E, which completes the cutting of the cheese. By then pulling on the wire J, which follows the movement of the knife M and is guided in the slot C, it cuts the inner part of the cheese which was not cut by the knife M.

In cutting the halves of the cheese A the cutting is done from the center of the cheese to the edge and downward in line with the gage and the slot C, either by the use of the knife or the wire, or of both combined, as described above.

It will be seen that the knife cuts principally through the crust part of the cheese, while the inner softer part of the cheese is cut by the wire.

The spring H expands and contracts according to the pull exerted on the knife M, and acts as a tension-piece to keep the wire tight, so that it will follow the cut started by the knife-point, and thereby cuts the cheese on a straight line.

Having thus fully described my invention, I claim as new and desire to secure by Letters Patent—

1. A cheese-cutter consisting of a centrally-slotted platform, B, of a wire secured below the said platform, and of a knife attached to the said wire, substantially as shown and described.

2. In a cheese-cutter, the combination, with the platform B, having the central slot, C, of the cross-piece E, the wire J, attached to a spring, H, and passing over the pulley L, and the knife M, attached to the outer end of the said wire J, substantially as shown and described.

3. In a cheese-cutter, the combination, with the platform B, having the central slot, C, of the cross-piece E, the spring H, passing over the pulley I, the wire J, guided by the pulley L, and the knife M, attached to the outer end of the said wire J, substantially as shown and described.

4. In a cheese-cutter, the combination, with the platform B, having the slot C, of the cross-piece E, the spring H, passing over the pulley I, the wire J, guided by the pulley L, the knife M, attached to the outer end of the said wire J, and the adjustable angular gage G, mounted on the standard F, substantially as shown and described.

SAMUEL P. HODGEN.

Witnesses:
    GEO. W. BEARD,
    H. L. MONTAGUE.